United States Patent [19]

Riemer

[11] Patent Number: 4,490,041
[45] Date of Patent: Dec. 25, 1984

[54] DEVICE FOR APPLYING RADIATION AT ADJUSTABLE ANGLES

[75] Inventor: Fritz Riemer, Essingen, Fed. Rep. of Germany

[73] Assignee: Carl-Zeiss-Stiftung, d/b/a Carl Zeiss, Heidenheim, Fed. Rep. of Germany

[21] Appl. No.: 326,679

[22] Filed: Dec. 2, 1981

[51] Int. Cl.³ .............................................. G01J 3/18
[52] U.S. Cl. ................................................. 356/334
[58] Field of Search .......................... 356/51, 331–334; 350/486; 250/339

[56] References Cited

U.S. PATENT DOCUMENTS

| Re. 26,053 | 7/1966 | Cary | 356/333 |
| 2,856,531 | 10/1958 | Brouwer | 356/334 X |
| 3,069,966 | 12/1962 | White | 356/334 |

OTHER PUBLICATIONS

Finkelstein, *Journal of the Optical Society of America*, vol. 41, No. 3, Mar. 1951, pp. 179–182.

Primary Examiner—F. L. Evans
Attorney, Agent, or Firm—Stonebraker, Shepard & Stephens

[57] ABSTRACT

A device for applying radiation to an object at adjustable angles of incidence while maintaining the beam impingement point constant. For the deflection of the radiation (4, 11) which is incident from a predetermined direction, a flat deflection mirror (5, 12) is arranged in front of the object (6, 13), the mirror being turnable around an axis (7, 19) which is located outside of its reflective surface. The beam impingement point on the object (6, 13) remains sufficiently constant within a predetermined range of swing of the mirror (5, 12). The device is advantageously employed in monochromators, particularly ultra-high vacuum monochromators. In that case, the object is formed of a dispersion element. For the continuous adjustment of the angle of incidence on the grating, only a single actuating element (20) for turning the mirror (5, 12) is required.

8 Claims, 3 Drawing Figures

DEVICE FOR APPLYING RADIATION AT ADJUSTABLE ANGLES

BACKGROUND OF THE INVENTION

The present invention relates to a device for applying radiation to an object under adjustable angles of incidence while maintaining the point of impingement of the beam constant, a reflection element being arranged in front of the object in order to deflect the radiation incident from a predetermined direction.

Such a device is used, for instance, in monochromators in which the object to be acted on by the radiation is developed as a dispersion element. This dispersion element is turnable, for selection of the wavelength, around an axis fixed in space which lies in the optically active surface. In order to maintain the optical conditions the same in every operating condition and thus avoid errors, it is necessary that the radiation, regardless of the angle of incidence, strike very precisely on the axis of rotation which is fixed in space, i.e. that the point of impingement of the beam remains constant.

This purpose can be achieved, in principle, by a rotation and simultaneous translation of the deflection element. Since both movements must be carried out with a high degree of precision, such a solution results in a very large expense for precision equipment.

It is also conceivable to provide a plurality of deflection elements each of which has a fixed location and angular position, which can be brought alternately into the beam path. Aside from the fact that a continuous change of the angle of incidence is not possible in such case, such a device is also very expensive and entails additional absorption.

SUMMARY OF THE INVENTION

The object of the present invention is to provide a device of the type described which permits, within a preselected angular range, a continuous adjustment of the angle of incidence while maintaining the beam-impingement point sufficiently constant, and one which is not expensive.

This object is achieved in accordance with the invention by a device having a reflection element which has a flat reflective surface and which is turnable about an axis which lies outside the plane containing said reflective surface.

The reflection element is therefore to be turned only about a single axis in order to adjust the angle of incidence of the radiation. Such a rotation can be effected by means of merely one adjustment element; in other words, the device is simple and of inexpensive construction.

The axis of rotation of the reflection element lies above its reflective surface, for instance within the object to be acted on by the radiation. Its exact position in space can be determined from the angular range within which the angle of incidence is to be adjusted.

For a preselected range of the angle of incidence the position of the axis of rotation of the reflection element can be determined in such a manner that, for three angles of incidence lying within the selected range, the point of impingement of the beam on the object is struck with high accuracy so that therefore the course of the radiation on the object is exactly the same for three angular positions of the reflection element. The deviations in positions between these specified angular positions are very small; the agreement in location lies within the diffraction limit.

The device in accordance with the invention finds particularly advantageous use in monochromators, in which case the object to be struck by the radiation is developed as a dispersion element, for instance as a diffraction grating.

The maintaining constant of the point of impingement of the beam on the dispersion element is particularly important here since, in general, the radiation strikes the dispersion element in slightly divergent fashion.

The device in accordance with the invention finds particularly advantageous application in ultra-high vacuum monochromators. In this case, each vacuum lead-in is extremely expensive so that the fact that only a single drive element and accordingly only one vacuum lead-in is necessary in the device according to the invention results in a decisive saving.

BRIEF DESCRIPTION OF THE DRAWINGS

The invention will be explained in further detail below with reference to the accompanying drawings in which.

DESCRIPTION OF THE PREFERRED EMBODIMENTS

Figure 1:
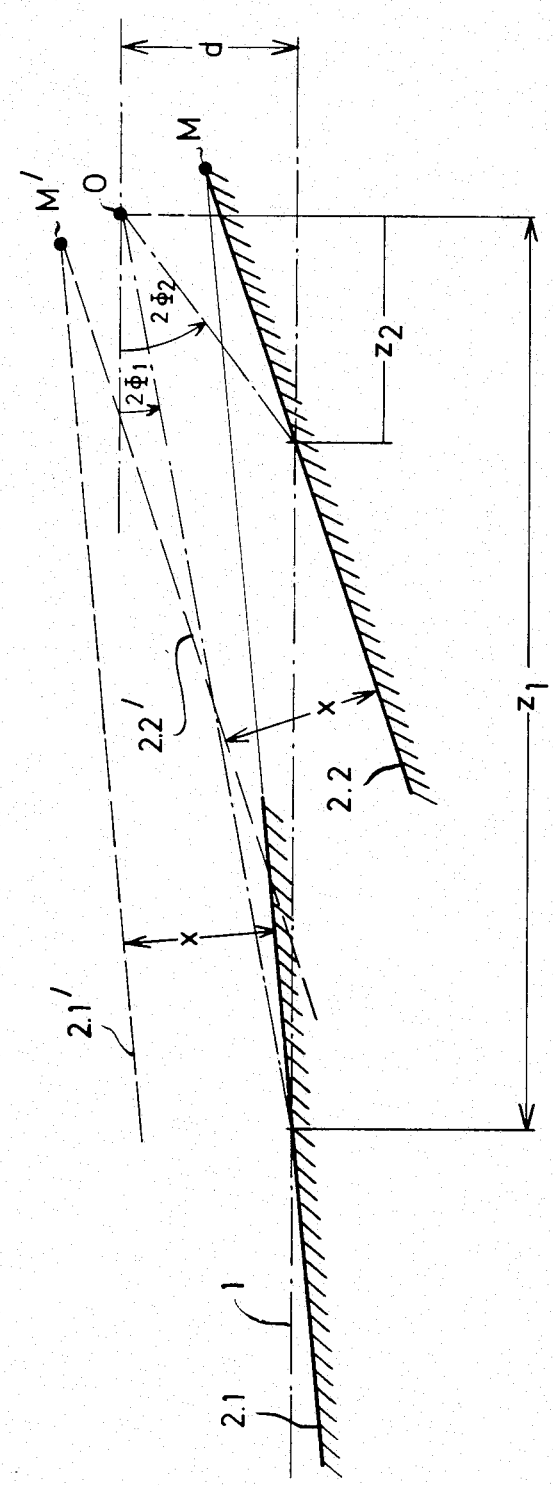
FIG. 1 is a basic diagram showing the geometrical-optical conditions.

In FIG. 1, the object point to be struck by the irradiation is designated O. The radiation 1 coming from the left strikes against a flat mirror, which is shown here in a first position 2.1, and strikes the object O under the angle of incidence $2\Phi_1$. In a second position 2.2 of the mirror the result can also be obtained that the radiation 1 strikes precisely on the object point O; the angle of incidence is now $2\Phi_2$. The two mirror positions 2.1 and 2.2 serve to establish or define the position of an axis of rotation whose point of passage through the plane of the drawing is designated M; d is the distance between the incident direction of the radiation 1 and the plane of the object O.

If the object is now to be struck at an angle $2\Phi$, the mirror being moved accordingly, then the relationship $$Z = d/\tan 2\Phi$$

must be satisfied if the radiation is always to strike the point O. Since Z is dependent in non-linear fashion on $2\Phi$, the object point O will not be struck in all positions of the mirror between 2.1 and 2.2 by the reflected radiation when the mirror is turned around the axis M.

The invention is not based on the discovery that, with a suitable selection of the value X for the two equi-distances 2.1' and 2.2' an axis of rotation passing through M' can be found for which agreement of the radiation on the object is obtained with a further position of the mirror, i.e. the object point O is struck. In the mirror positions lying between the three indicated angular positions of the mirror thus ascertained, the deviations become very small and there is agreement within the diffraction limit.

Figure 2:
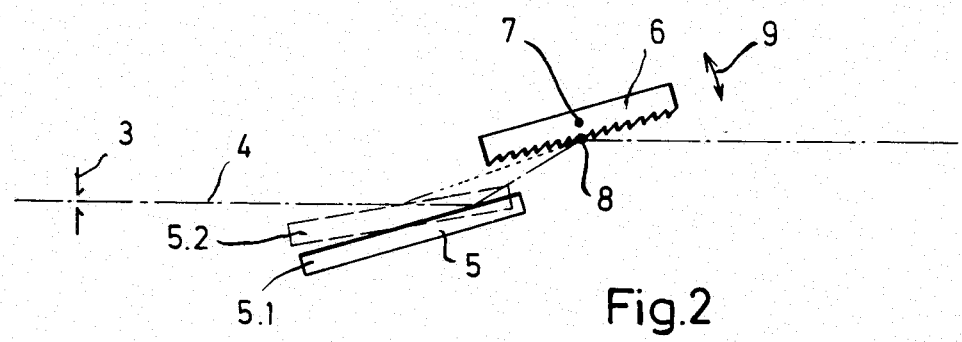
FIG. 2 is a diagrammatic partial showing of a monochromator developed in accordance with one embodiment of the invention.

FIG. 2 shows the use of the principles of the invention in the case of a monochromator. The radiation 4 coming through the entrance slit 3 strikes against a flat mirror 5 and is deflected by the latter onto a diffraction grating 6. The mirror 5 is turnable about an axis 7 which lies within the grating 6 above the reflective surface of the mirror. The grating 6 is swingable in the direction of the double-ended arrow 9 around an axis 8 lying in its optically active surface.

The mirror 5 is shown in two positions, the full line position 5.1 and the broken line position 5.2. In both positions of rotation the radiation 4 strikes the grating 6 at the radiation impingement point defined by the axis 8.

Further elements (not shown here) of the monochromator are arranged behind the grating 6.

Figure 3:
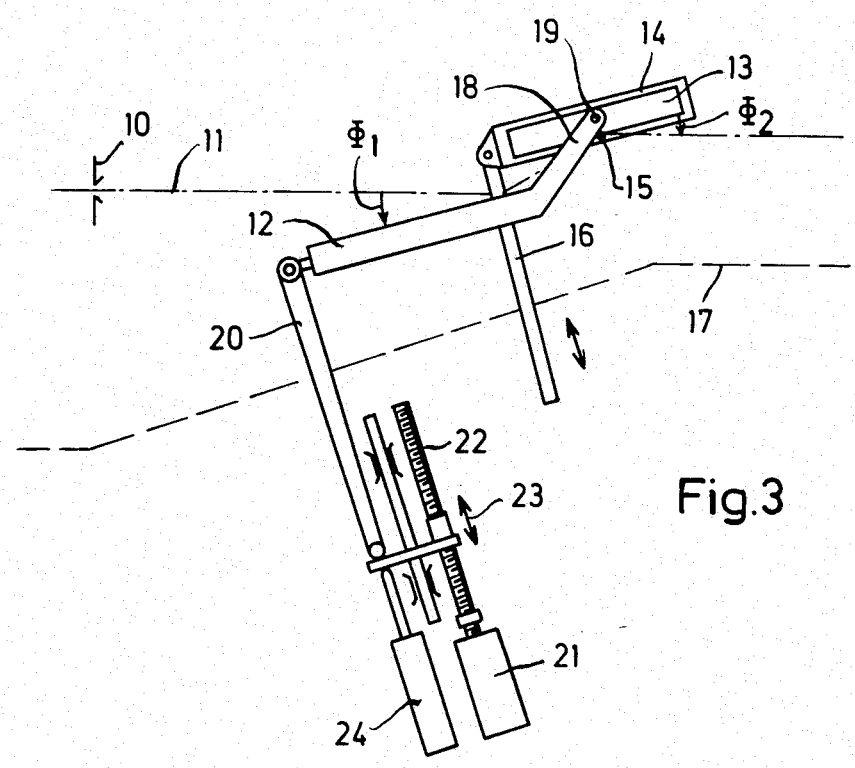
FIG. 3 is a partial showing of another embodiment of the invention, applied to a vacuum monochromator.

FIG. 3 shows a high-vacuum monochromator utilizing the invention. The radiation 11 coming from the entrance slit 10 is deflected by the flat mirror 12 and strikes against the diffraction grating 13. The latter is arranged in a housing 14 which is turnable around the axis passing through the beam impingement point 15. This rotation is effected by means of a motor-driven rod 16 which is conducted in vacuum-tight manner through the housing 17, shown diagrammatically.

The mirror 12 is pivotally connected to the housing 14 by a lever 18. The axis of rotation extends through the point 19. A rod 20 which is passed in vacuum-tight manner through the housing 17 is articulated to the mirror 12. The rod 20 is moved in the direction indicated by the double-ended arrow 23 by a motor 21 driving a threaded spindle 22. A measurement instrument 24 is directly coupled to the motion mechanism, by means of which instrument the actual position of the mirror 12 can be read. A similar measurement instrument is connected to the rod 16 for the turning of the grating 13.

In the case of the monochromator shown here, the angle $\Phi_1$ between the surface of the mirror 12 and the entrance beam direction 11 can be continuously adjusted, for instance, between 1.5° and 13°, an aggrement in position of the radiation on the grating 13 which is within the diffraction limit resulting for each angular position. The radiation strikes in slightly divergent fashion against the grating 13. In the example indicated, the latter can be turned through an angle $\Phi_2$ of between 1° and 24°.

What is claimed is:

1. A device for applying a beam of radiation to an object at adjustable angles of incidence while maintaining the point of impingement of the beam upon the object constant, said device comprising an object turnable around an axis, a reflection element in front of said object positioned to deflect radiation incident from a predetermined constant direction, and means for moving said reflection element, characterized by the fact that said reflection element has a flat reflecting surface and is movable by said means, during adjustment of said angles of incidence, only by swinging about a single axis (7, 19) which lies outside of a plane containing said reflecting surface and which is fixed in space relative to the axis of turning of said the object, adjusting movement of said reflection element involving no movement of translation as distinguished from its swinging movement on said single axis.

2. The invention defined in claim 1, wherein the swing axis of the reflection element (5, 12) lies above its reflecting surface.

3. The invention defined in claim 1, wherein the object (6, 13) to be acted on by the radiation (4, 11) is a dispersion element of a monochromator, and wherein said dispersion element is turnable around an axis located substantially at the beam impingement point (8, 15).

4. A device for applying a beam of radiation to an object at variable adjustable angles of incidence of the beam impinging upon the object while maintaining the point of impingement of the beam on the object at a substantially constant point with respect to the object notwithstanding variations in the angle of incidence of the beam, said device comprising:
    (a) an object to which radiation is to be applied;
    (b) means for projecting a beam of radiation along a fixed path in a general direction toward said object but in non-intersecting relation to said object; and
    (c) plane reflector intersecting said fixed path;
    (d) said reflector being so positioned that radiation travelling along said fixed path in a general direction toward said object will be deflected by said reflector and will continue from said reflector along a second path impinging upon said object;
    (e) said reflector being mounted for swinging movement about a single swing axis which remains in fixed position in space while swinging said reflector during adjustment to a different angle of incidence and which is located relatively close to the point of impingement of said second path on said object;
    (f) the mere swinging of said reflector on said single swing axis serving to vary the distance that radiation travels along said fixed path before striking and being deflected by said reflector and thereby serving to vary the angle of incidence of said second path upon said object;
    (g) said swing axis being so located that the point of impingement of said second path upon said object is substantially constant notwithstanding swinging of said reflector on said single swing axis.

5. The invention defined in claim 4, wherein said object is a dispersion element and is mounted for swinging movement on an axis parallel to and relatively close to said swing axis of said reflector.

6. The invention defined in claim 5, wherein said object is a diffraction grating.

7. The invention defined in claim 4, wherein said reflector is a plane mirror.

8. A device for applying a beam of radiation to a diffraction grating at variable adjustable angles of incidence of the beam impinging upon the grating while maintaining the point of impingement of the beam on the grating at a substantially constant point with respect to the grating notwithstanding variations in the angle of incidence of the beam, said device comprising:
    (a) a swingable diffraction grating to which radiation is to be applied;
    (b) means for projecting a beam of radiation along a fixed path in a general direction toward said grating but in non-intersecting relation to said grating; and
    (c) a plane reflector intersecting said fixed path;
    (d) said reflector being so positioned that radiation travelling along said fixed path in a general direction toward said grating will be deflected by said reflector and will continue from said reflector along a second path impinging upon said grating;
    (e) said reflector being mounted for swinging movement about a swing axis located relatively close to the point of impingement of said second path on said grating;

(f) the swinging of said reflector on said axis serving to vary the distance that radiation travels along said fixed path before striking and being deflected by said reflector and thereby serving to vary the angle of incidence of said second path upon said grating;

(g) said swing axis being so located that the point of impingement of said second path upon said grating is substantially constant notwithstanding swinging of said reflector on said swing axis;

(h) a vacuum-tight housing (17) containing said diffraction grating and said reflector;

(i) an adjusting rod (16) operatively connected to said diffraction grating (13) and extending in vacuum-tight manner through said housing to the exterior thereof for swinging said diffraction grating from the exterior of said housing; and (j) a second adjusting rod (20) operatively connected to said reflector (12) and extending in vacuum-tight manner through said housing to the exterior thereof for swinging said reflector on its swing axis (19) from the exterior of said housing.

* * * * *